United States Patent [19]

Boudreau et al.

[11] Patent Number: 5,369,681
[45] Date of Patent: Nov. 29, 1994

[54] CELLULAR COMMUNICATIONS SYSTEM UTILIZING PAGING AREAS

[75] Inventors: Alain Boudreau, Le Gardeur; Andre Beauregard, Bois Briand, both of Canada

[73] Assignee: Telefonaktiebolaget L M Ericsson, Stockholm, Sweden

[21] Appl. No.: 882,607

[22] Filed: May 12, 1992

[51] Int. Cl.$^5$ .............. H04M 11/00; H04Q 7/00; G08B 5/22
[52] U.S. Cl. .............. 379/87; 379/59; 455/33.1; 340/825.44
[58] Field of Search .............. 340/825.03, 825.44, 340/825.47; 379/56, 57, 58, 59, 60; 455/33.1, 33.2

[56] References Cited

U.S. PATENT DOCUMENTS

| | | | |
|---|---|---|---|
| 4,775,999 | 10/1988 | Williams | 379/59 |
| 4,814,763 | 3/1989 | Nelson et al. | 340/825.44 |
| 4,843,622 | 6/1989 | Yotsutani et al. | 379/59 |
| 5,111,197 | 5/1992 | Ichikawa | 340/825.44 |
| 5,153,902 | 10/1992 | Buhl et al. | 379/57 |
| 5,175,758 | 12/1992 | Levanto et al. | 379/57 |
| 5,247,698 | 9/1993 | Sawyer et al. | 455/33.1 |
| 5,278,890 | 1/1994 | Beeson, Jr. et al. | 379/57 |
| 5,282,240 | 1/1994 | Buhl et al. | 379/59 |

FOREIGN PATENT DOCUMENTS 3137024 3/1983 Germany .............. 379/57
2193861 2/1988 United Kingdom .

OTHER PUBLICATIONS

Thomas et al "Performance Evaluation of the Chanel Organization of the European Digital Mobile Communication System" IEEE Sep. 1988.

Primary Examiner—Curtis Kuntz
Assistant Examiner—William Cumming
Attorney, Agent, or Firm—Johnson & Wortley

[57] ABSTRACT

A system for paging mobile stations within a cellular telecommunication system wherein paging areas, which are composed of a plurality of location areas, are created to provide a means for locating a mobile station when the mobile station has not responded to a location area page and without requiring a service area page. The system sends a page request to the location area where the desired mobile station last registered. If a response is not received, the system sends a page request to the paging area which includes a plurality of location areas where the mobile station is likely to be found. If a page response is still not received from the desired mobile station, then a page request will be sent to all of the location areas within the service area.

4 Claims, 3 Drawing Sheets

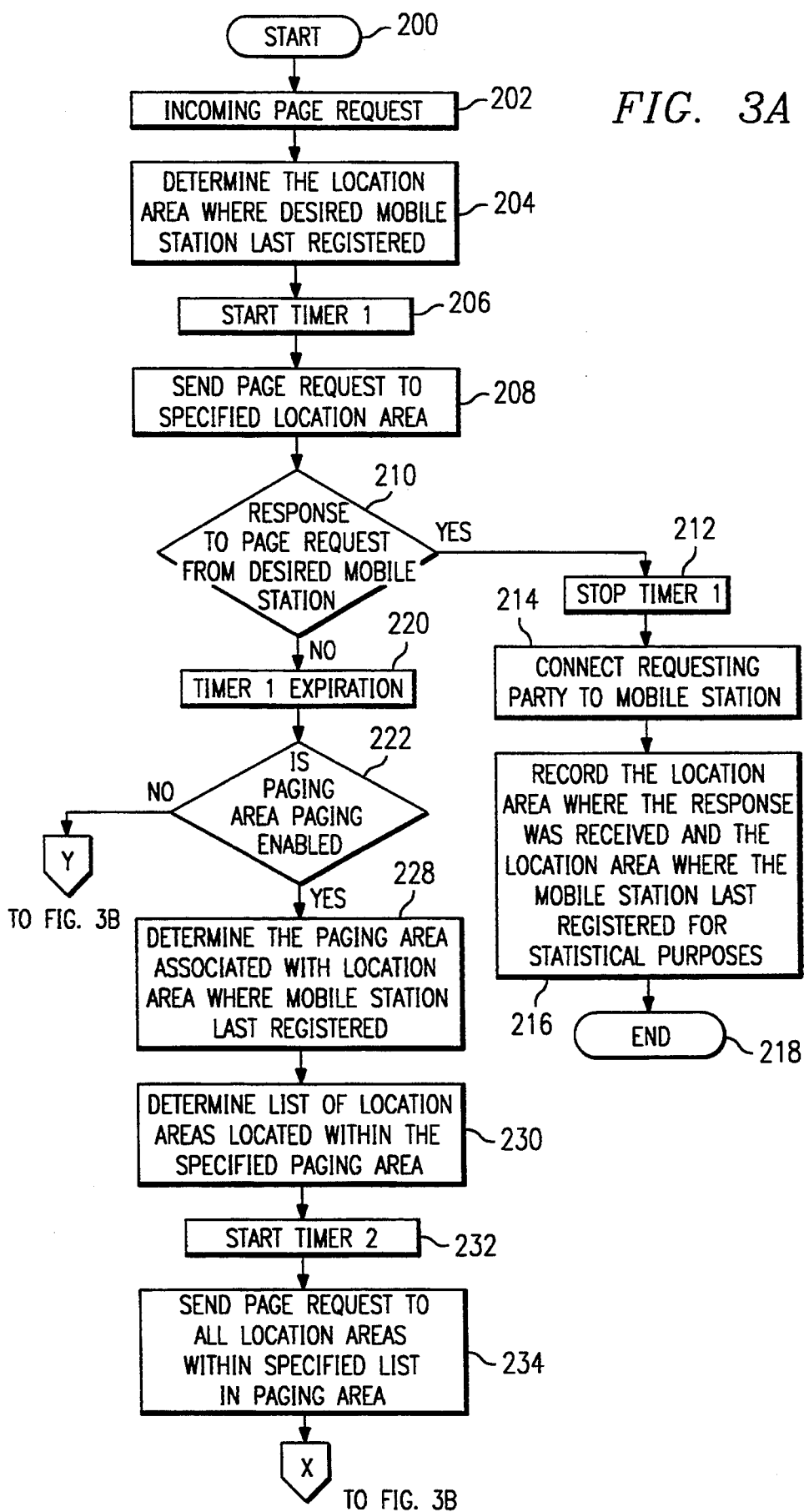

CELLULAR COMMUNICATIONS SYSTEM UTILIZING PAGING AREAS

CROSS REFERENCE TO RELATED APPLICATION

This application contains subject matter related to copending U.S. patent application Ser. No. 07,88,598 filed May. 12, 1992 now pending in the name of K. Raj Sanmugam, entitled "Paging System For Allocating Control Channel Paging Capacity," assigned to the assignee of the present invention and incorporated by reference herein.

BACKGROUND OF THE INVENTION

1. FIELD OF THE INVENTION

The present invention relates to paging within cellular communication systems, and more particularly, to the efficient allocation of paging distribution within a cellular communication system.

2. History of the Prior Art

Cellular radio communications is, perhaps, the fastest growing field in the world-wide telecommunications industry. Its growth has been such that in recent years the capacity of existing systems has been severely stressed to serve all of the subscribers who would like to have access to the system, particularly in major metropolitan areas. Moreover, cellular radio technology is currently moving from analog based systems, in which each subscriber communications channel is allotted to a single radio channel, to digital based systems in which a plurality of subscriber channels can be assigned to each radio channel through time division multiple access (TDMA) radio technology. In TDMA radio each channel is divided into a plurality of time slots and a digitized portion of each subscriber channel is broadcast in a different time slot.

However, despite the use of digital technology, such as TDMA, to increase cellular radio system capacity, the tremendous demand for cellular radio service is placing other demands on the system. For example, communication between the radio base stations within the system and the mobile stations within the system are divided into a plurality of voice or speech channels and at least one access or control channel, which may be either analog or digital and which may have any data rate. An illustrative one of such access or control channel is referred to as the forward control channel (FOCC).

Each mobile station which is operating within a cellular communications system must be locatable when a call is received by the system which is intended for that station. A mobile station is located by broadcasting a paging signal directed to the mobile and requesting it to respond if it receives the page. When the mobile broadcasts its page response signal to the page signal it is then placed on a voice channel by the base station and the call intended for the mobile can be connected to it through that voice channel. Cellular telecommunications systems employ a control channel such as the forward control channel (FOCC) as the means by which paging signals are broadcast into the various cells of the system in order to locate a particular mobile station. Thus, the more paging within a system the more radio traffic there is on the FOCC of the system. The continued subscriber growth within cellular systems along with the continued introduction of additional functionalities within the system will undoubtedly greatly increase the paging load within each system and place an even higher demand for FOCC capacity within each system.

The capacity of the control channel, such as the FOCC, within a system may be limited because of at least two reasons. For example, the data rate over certain forward control channels is restricted to a rate on the order of 8-10 K bits per second which is a speed limitation imposed by the technology used in that implementation. Secondly, the control channel must also be utilized to transmit other messages to the mobile stations, including, for example, voice channel designations, directed retry orders, system ordered rescan signals and system overhead message trains each of which use substantial control channel capacity each time they are transmitted. Thus, it is desirable to utilize the control channel capacity in as an efficient manner as possible by paging in as localized an area as possible and still reliably locating the mobile station being sought by the system.

In conventional cellular radio systems, paging within each system is employed to serve not only its own paging needs but also the paging needs of the various cooperating exchanges which seek to locate mobile subscribers within the exchange in response to call requests within their own exchanges. Paging provides the service of attempting to locate a mobile station's whereabouts within the exchange in order to set up a call to that mobile station.

More specifically, the paging process in mobile cellular radio systems, attempts to identify the specific cell containing that mobile, as described above in connection with the paging process. During the execution of this process, the mobile switching center (MSC) searches for the mobile by sending a sequence of paging messages on the FOCC of the system and awaits a page response. Obviously, the page message muse be transmitted to all of the cell sites covering the entire service area of the system in order to ensure that the mobile is located regardless of where it might be within the system. This implies that when the use of paging capacity on all the control channels in the exchange is required, only one mobile can be paged at any given time. This limitation on cellular system capacity has been improved by the definition of "location areas" (LA's) wherein the entire service area of an exchange is divided into a plurality of different location areas. Each LA may consist of one or more individual cells within the system. Each mobile informs the system as to its specific LA identification either periodically or whenever it crosses a location area border by means of registration access within the system. The definition of LA's allows selective paging within the system thereby conserving paging capacity resources. That is, if the LA of a mobile station to be located is known then a page message for that mobile is sent only within that particular LA. As a result of this modification of the paging process, as many different mobile stations may be paged simultaneously as there as location areas within the system which greatly increases the paging capacity of the system.

In present systems, when a page remains unanswered by the mobile station which is sought, the page must be repeated. This repetition can be either within a location area previously paged or within the entire service area (SA) of the system. The present practice within cellular radio systems is to employ the paging process to handle incoming page requests on a "first come, first served" basis. Depending upon whether the location area (LA) of the requested mobile station is known or not, the amount of paging capacity allocated to serve a particular page request is the same. That is, if the LA of the mobile station is known then the first page attempt is within the LA. Otherwise, it is within the service area SA which includes all of the LA's within the exchange. If no response is received to the page, the page is repeated either within the LA itself or within the SA.

When attempting to route a call to a mobile station, the MSC must specifically know in which cell the mobile station is located. In accomplishing the task of locating the mobile, the MSC pages the mobile station in the location area where the mobile station last registered. This prevents a global or system-wide page wherein all the cells within an exchange are paged simultaneously. If the mobile station does not answer the page request in the registered location area of its last registration, only then is service area or global paging required in order to locate the mobile.

Experience with the management of cellular communication systems has shown that a high percentage of mobile stations do not answer location area paging. There are three main causes for this problem. The first is the continual existence of earlier manufactured mobile stations which are able to store four different area identification codes (AIDs) within their internal memory. Such mobile stations will not perform forced registration if they remain within the same four location areas corresponding to the four AIDs stored within the mobile station's memory. If a mobile station moves from one of these four location areas to another, a forced registration does not occur and the mobile will not answer the page, thus requiring service area paging to contact the mobile.

As previously noted, the division of a service area into location areas was deemed advantageous to alleviate capacity problems within the FOCC, especially in those situations where the number of subscribers served by one MSC had reached a level on the order of 40,000 to 50,000 mobile stations. The FOCC cannot efficiently handle all page requests in a system utilizing only system-wide paging since all the cells within the system area are simultaneously paged. The division of the system area into location areas, which include a relatively small number of cells, was created to permit a page request to be directed to a specific location area if the desired mobile station was known to be located within that specific location area.

Whenever a mobile station crosses the border between two location areas, it is required to make a registration access to the MSC by means of a bit in the overhead message of the FOCC. Crossing of the border is detected by the mobile station due to the fact that the AID in the overhead message on the FOCC from the new location area is not equal to the AID received in a prior forced registration and stored within the mobile's memory. However, if a mobile station is able to store four AIDs within its internal memory, as the older models are able to do, then when it crosses the border between location areas whose AIDs are currently stored within the memory of the mobile station, a forced registration will not occur since the AID of the new location area is the same one of the AIDs of the prior location area stored within the memory of the mobile station. Thus, the mobile station will not answer a page directed to the location area of last registration, because the MSC will not have an accurate indication of where the mobile is currently located. This will continue as long as the mobile station remains within a group of four location areas, whose AIDs are stored within the mobile's memory, which is often the case.

The second reason why mobile stations often do not respond to a location area page relates to "rescanning" by the mobile stations. To ensure optimum performance, mobile stations access the system (for the purposes of registration, call initiation, and page response, for example) on the best available control channel. For this reason, before each access, the mobile station will "rescan" and listen to all the available control channels to choose the one having the best signal strength for access. The specification of the cellular system air interface standard causes the mobile stations to rescan both before and after every access. For example, when a mobile station detects that it has crossed a location area (or service area) border, it conducts a forced registration. The mobile station rescans for the control channel with the best signal strength, performs the forced registration message exchange and then rescans again, this time without checking whether or not the mobile station has again crossed a border. After the access, the mobile station then remains tuned to the best quality control channel it found during the second "rescan." If the second control channel found by the mobile station is different from the first, because the mobile crossed another border, the mobile station will not be tuned to the control channel of the location/service area in which it last registered and, thus, become "lost" to the system. This situation is quite common especially when a mobile station is moving along a border between location areas or exchanges. The control channels of the neighboring location areas or exchanges begin to compete with each other since both their respective signals are being received by the mobile station. The two signals will fade in and out as the mobile moves along the border.

In other words, if the second control channel belongs to a location area different than the control channel found when performing the first rescan, and the mobile is now located in the first location area, service area paging will be needed to find the mobile station. If the second control channel belongs to a neighboring exchange, the mobile station will not answer to any page at all from the first exchange and will not be able to receive any calls.

A third reason why a mobile station may not respond to a location area page is related to the addition of more and more subscribers to a mobile telephony system. In metropolitan areas, where there is a high concentration of subscribers, the cell radii are becoming smaller and smaller. The same cochannel reuse frequencies are being used by cells that are getting closer and closer in order to accommodate increased traffic density. Thus, when performing an access (specifically registrations), if the access is heard by more than one cell using the same control channel, there can be inconsistencies between where the MSC (or the mobile network if the multiple access is between cells that belong to different MSCs) believes the mobile is located and the actual location of the mobile. One solution to the capacity problem which is occurring within the available frequencies and the associated FOCC control channels is that of geographically closer frequency reuse. A utilization of both location and paging area paging allows for a multiple use of the FOCC channel since multiple mobiles can be paged using the one FOCC channel.

Because of the foregoing problems inherent in existing cellular communication systems, it is desirable to introduce a system of paging utilizing paging areas, which allow paging within a greater number of cells than that of a location area without having to page in the entire service area. Paging areas serve as a middle step between location area paging and service area paging and thereby improve the capacity and the efficiency of the forward control channel. As an example, a service area can be divided into 16 location areas. If a paging area contains four location areas, the use of paging area paging reduces the load caused by a service area page by a factor of four. Service area paging can still be utilized if the mobile station does not respond to the paging area page. However, i f the paging areas are wisely defined by the system operator, a very small percentage of the calls will need service area paging.

This system of utilizing paging areas can also be implemented on a multi-exchange basis. In such a situation, paging areas may include within their borders location areas located in adjacent service areas.

SUMMARY OF THE INVENTION

In one aspect of the invention, paging areas composed of a plurality of location areas provide a means for locating a mobile station which has not responded to a location area page without requiring a service area page.

In another aspect, the present invention includes a system for paging mobile subscribers within the service area of a cellular communications system which comprises a plurality of cells grouped into contiguous locations areas each having one or more cells. Mobile subscribers are first paged in the particular location area within which they last registered with the system. Thereafter, the mobile subscribers are paged in a plurality of location areas within the service area of the system in response to failure of the mobile subscribers to respond to the particular location area pages. The location areas from which a page response is received from said mobile subscribers in response to said pages within a plurality of location areas are recorded. The location areas are then arranged in groups forming paging areas, each containing a plurality of locations areas and with each paging area being associated with a particular location area based upon the previously recorded statistical likelihood of locating a mobile within the particular group of location areas comprising a paging area when it last registered in the associated location area. The plurality of location areas within which the mobile subscribers are paged, following failure to respond to a location area page, may be either a paging area or all of the location areas within the service area of the system.

In still another aspect, the present invention includes a system for paging mobile stations within a cellular telecommunications system in which groups of cells are arranged in location areas and groups of location areas are arranged in paging areas. A call request for a desired mobile station is received from a calling party, the location area within which the desired mobile station last registered is determined and a page request is sent to the location area. The calling party is connected to the mobile station if a page response is received from the mobile station in response to the page request. If both paging area paging and service area paging is not enabled for the system and a page response is not received from the mobile station in response to the page request the calling party is informed that the mobile station is not available. If paging area paging is enabled for the system, the paging area which is associated with the location area where the mobile station last registered is determined. Next, a list of a plurality of location areas defined by the paging area is determined and a page request is sent to the plurality of location areas within the paging area. The calling party is connected to the mobile station if a page response is received from the mobile station in response to the page request. If, however, service area paging is not enabled for the system and a page response is not received from the mobile station as a result of the page request, the calling party is informed that the mobile station is not available. I f, however, service area paging is enabled for the system a page request is sent to all location areas within the service area. The calling party is informed that the mobile station is not available if a page response is not received from said mobile station in response to the service area page.

BRIEF DESCRIPTION OF THE DRAWINGS

For a more complete understanding of the present invention and for further objects and advantages thereof, reference may now be had to the following description taken in conjunction with the accompanying drawings, in which:

FIG. 3A–3B is a flow chart illustrating the manner in which paging requests are handled, including the utilization of paging areas in accordance with the system of the present invention.

DETAILED DESCRIPTION OF THE PREFERRED EMBODIMENTS

Figure 1:
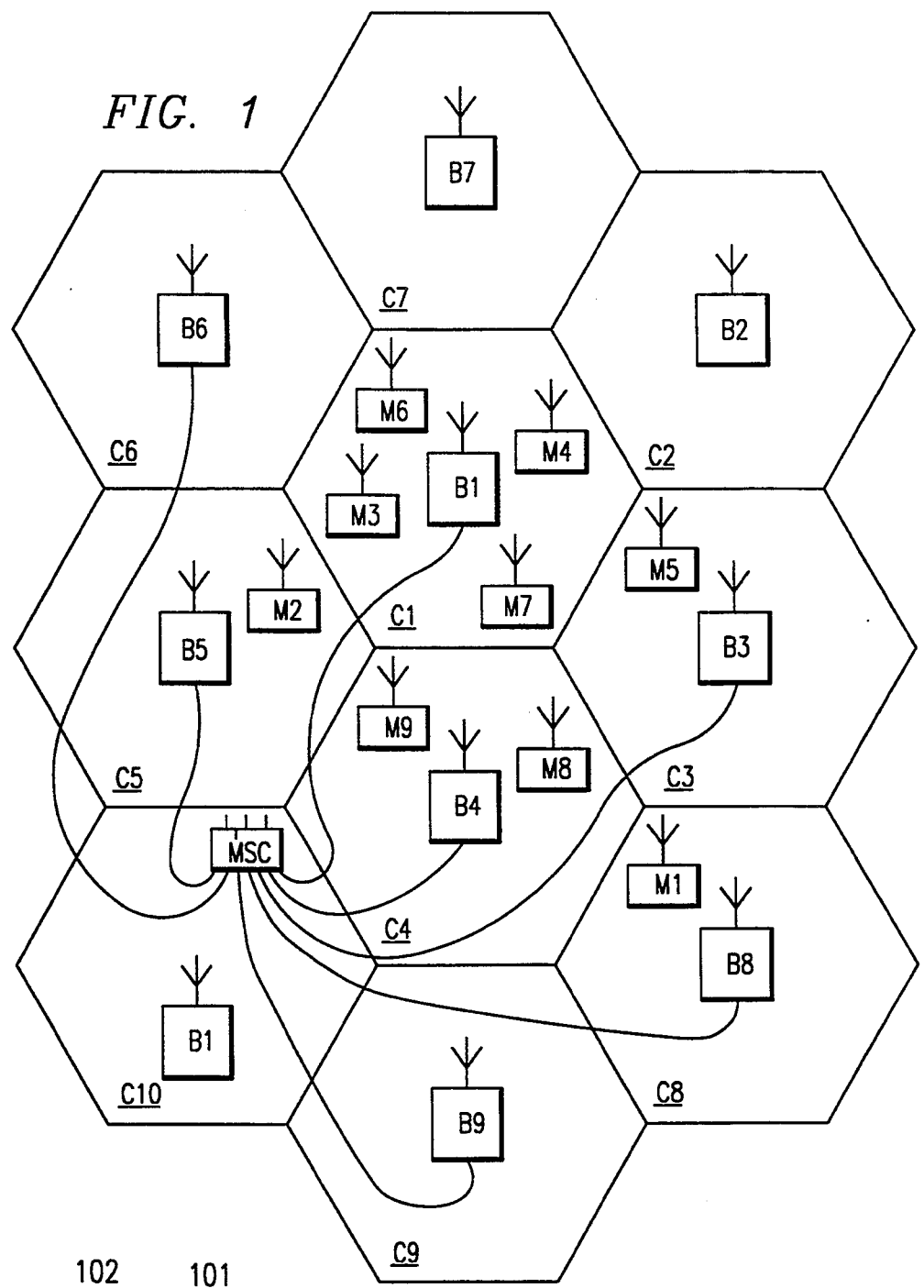
FIG. 1 is a pictorial representation of a cellular radio communication system including a mobile switching center, a plurality of base stations, and a plurality of mobile stations.

Referring first to FIG. 1, there is illustrated a conventional cellular radio communications system of the type to which the present invention generally pertains. In FIG. 1, an arbitrary geographic area may be divided into a plurality of contiguous radio coverage areas, or cells C1–C10. While the system of FIG. 1 is illustratively shown to include only 10 cells, it should be clearly understood that in practice, the number of cells will be much larger.

Associated with and located within each of the cells C1–C10 is a base station designated as a corresponding one of a plurality of base stations B1–B10. Each of the base stations B1–B10 includes a transmitter, a receiver, and base station controller as are well known in the art. In FIG. 1, the base stations B1–B10 are illustratively located at the center of each of the cells C1–C10, respectively, and are equipped with omni-directional antennas. However, in other configurations of a cellular radio system, the base stations B1–B10 may be located near the periphery, or otherwise away from the centers of the cells C1–C10 and may illuminate the cells C1–C10 with radio signals either omni-directionally or directionally. Therefore, the representation of the cellular radio system of FIG. 1 is for purposes of illustration only and is not intended as a limitation on the possible implementations of the cellular radio system within which the system of the present invention is implemented.

With continuing reference to FIG. 1, a plurality of mobile stations M1–M10 may be found within the cells C1–C10. Again, only 10 mobile stations are shown in FIG. 1 but it should be understood that the actual number of mobile stations will be much larger in practice and will invariably greatly exceed the number of base stations. Moreover, while none of the mobile stations M1–M10 may be found in some of the cells C1–C10, the presence or absence of the mobile stations M1–M10 in any particular one of the cells C1–C10 should be understood to depend, in practice on the individual desires of the mobile stations M1–M10 who may roam from one location in the cell to another or from one cell to an adjacent cell or neighboring cell, and even from one cellular radio system served by an MSC to another such system.

Each of the mobile stations M1–M10 is capable of initiating or receiving a telephone call through one or more of the base stations B1–B10 and a mobile switching center MSC. A mobile switching center MSC is connected by communication links, e.g., cables, to each of the illustrative base stations B1–B10 and to the fixed public switched telephone network PSTN, not shown, or a similar fixed network which may include an integrated system digital network (ISDN) facility. The relevant connections between the mobile switching center MSC and the base stations B1–B10, or between the mobile switching center MSC and the PSTN or ISDN, are not completely shown in FIG. 1 but are well known to those of ordinary skill in the art. Similarly, it is also known to include more than one mobile switching center in a cellular radio system and to connect each additional mobile switching center to a different group of base stations and to other mobile switching centers via cable or radio links.

Each of the cells C1–C10 is allocated a plurality of voice or speech channels and at least one access or control channel, such as a forward control channel (FOCC). The control channel is used to control or supervise the operation of mobile stations by means of information transmitted to and received from those units. Such information may include incoming call signals, outgoing call signals, page signals, page response signals, location registration signals, voice channel assignments, and maintenance instructions as a mobile station travels out of the radio coverage of one cell and into the radio coverage of another cell. The control or voice channels may operate either in an analog or digital mode or a combination thereof.

Figure 2:
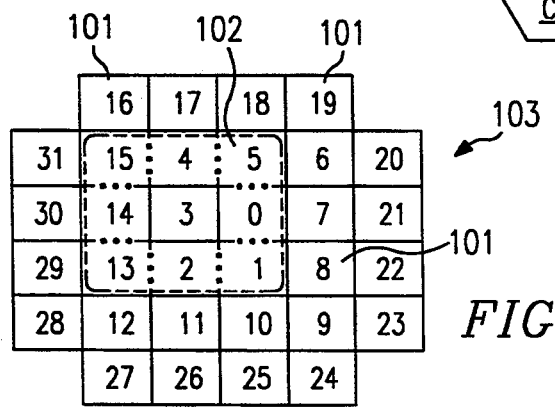
FIG. 2 is a block diagram illustrating the organization of an exemplary cellular radio service area partitioned into location areas, paging areas, and service areas.

Referring next to FIG. 2, there is shown a block diagram of a portion of the coverage area of an illustrative cellular radio system served by a particular MSC in which the cells, illustrated in FIG. 1, are organized into groupings to enable the more efficient utilization of the system resources. In FIG. 2, there are defined a plurality of location areas 101 shown as being thirty-two in number and numbered 0–31. Each location area (LA) 101 may include one or more individual cells. In addition, each location area 101 is surrounded by an additional grouping of location areas which together comprise a paging area (PA) 102. For example, the paging area 102 surrounding location area "3" includes location areas 1, 2, 3, 13, 14, 15, 4, 5 and 0. Finally, all of the location areas 101 taken together comprise the service area (SA) 103 of the system.

As shown in FIG. 2, the entire service area SA 103 is divided, by way of example, into thirty-two location areas LAs 101. Each mobile station informs the system of its current LA identification number by broadcasting that identification number either periodically or whenever the mobile crosses a location area border and is caused to do so by known registration access processes. The definition of the location areas 101 allows selective paging within the system. That is, if the location area of a particular mobile station desired to be located is known then the paging message is only sent within that particular location area. Thus, as many as thirty-two mobile stations may be paged simultaneously within the service area 103. It should be understood that the paging area within which a mobile is paged following an unanswered page within a location area may or may not include that location area depending on the particular circumstances.

An unanswered page is generally repeated. However, this repetition can be repeated within either the location area already paged, within the area surrounding the location area 101, i.e. the paging area 102, or within the entire service area 103. FIG. 2 illustrates the composition of the various paging fields comprising the location areas 101, paging area 102, and service area 103. For example, if initial paging is performed within location area "3" and no response is obtained, the next page could be broadcast within the paging area 102 surrounding location area "3", and if still no response is obtained from the mobile, the page could be repeated within the entire service area 103, covering all of the location areas 0–31. If, however, no particular location area is known for the mobile which is desired to be located, the paging must be by definition within the entire service area 103 including all thirty-two of the location areas 0–31.

It could be observed from FIG. 2 that the breadth of the paging field, i.e., LA, PA, or SA, generally represents the extent of the control channel (FOCC) capacity required to broadcast the paging message to the mobile within that field. That is, broadcasting a page within the entire service area requires paging capacity from all of the base stations in the exchange, while paging within one paging area requires capacity from fewer base stations and so forth. Various techniques may be employed to optimize the paging capacity of the FOCC such as those taught in copending U.S. patent application Ser. No. 07/881,598 filed May 12, 1992 now pending in the name of K. Raj Sanmugam, entitled "Paging System For Allocating Control Channel Paging Capacity" and assigned to the assignee of the present invention which is hereby incorporated by reference herein.

Figure 3B:
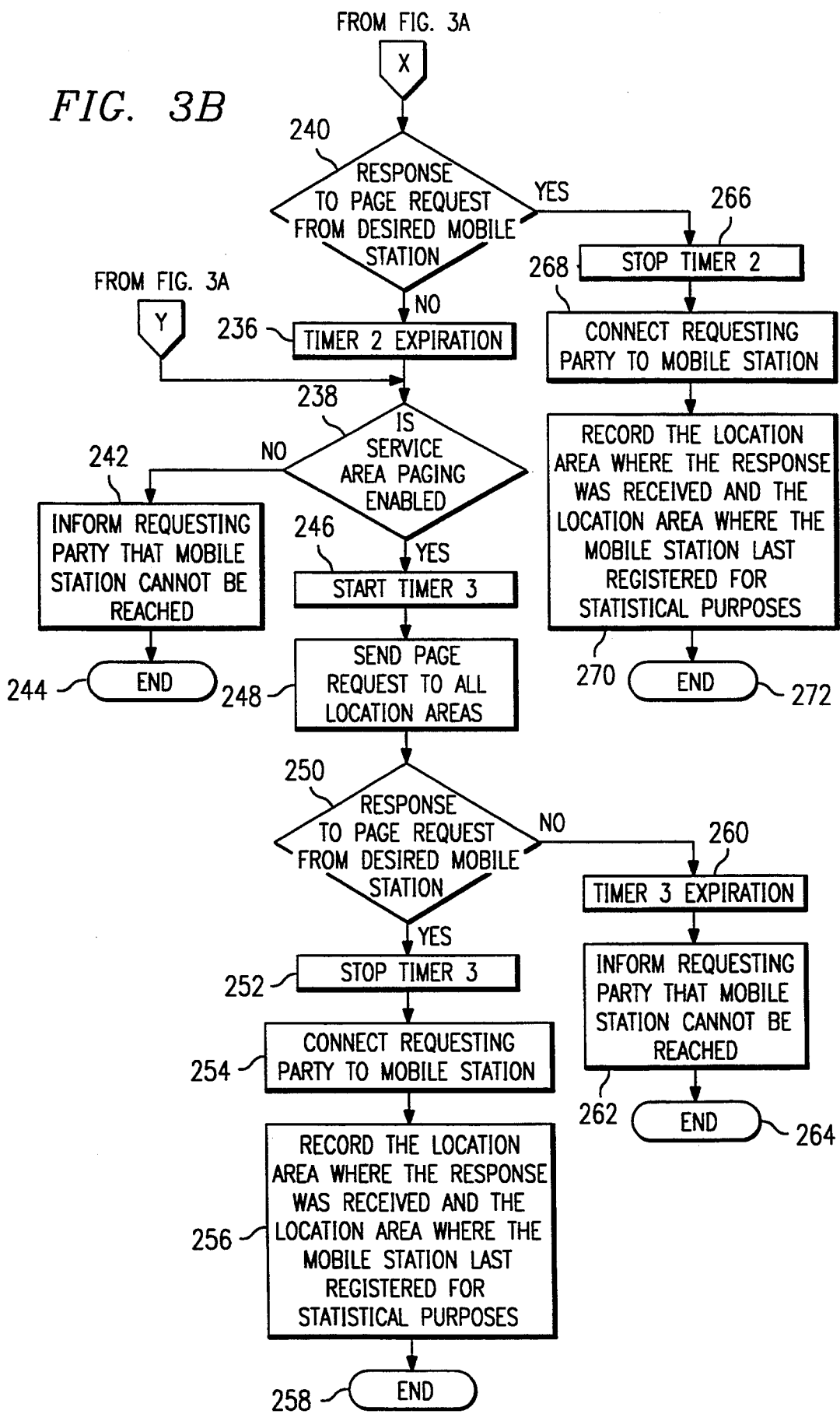

Referring next to the flow chart of FIG. 3A–3B, it is there illustrated how the system of the present invention implements a page request coming into the system. The procedure begins at 200, and at 202, an incoming page request is accepted into the system. Thereafter, at 204 the system recalls from its memory the location area from where the desired mobile station last registered. Next, at 206, a timer is started to establish how long one will wait for a response to a page request that will be transmitted to the specified location area where the mobile station last registered. At 208, the system sends a page request to the specified location area where the mobile station last registered. The system then asks at 210 whether a page response has been received from the desired mobile station. If a page response has been received from the mobile station, the system proceeds to 212 where the timer is stopped. Next, at 214, the system connects the mobile station to the requesting calling party. Thereafter, at 216 the system records the identity of the location area from which the response was received and where the mobile station last registered for statistical purposes. These statistics will be utilized in further optimizing the coverage of the location areas and the paging areas. The paging process ends at 218.

If at 210, a page response is not received from the mobile station, the system proceeds to 220 where the timer expires. Next, at 222 the system asks whether paging area paging has been enabled. If paging area paging has not been enabled, the system proceeds to 238 where it is determined whether or not service area paging is enabled for the system. If service area paging has not been enabled, the system proceeds to 242 where the calling party is informed that the mobile station cannot be reached. The paging process then ends at 244.

If, at 222 it is determined that paging area paging has been enabled, the system proceeds to 228 where the system retrieves from its memory the paging area parameters associated with the location area where the mobile last registered. Next, at 230 the system retrieves the list of the particular location areas defined by the specified paging area parameters. Thereafter, at 232 a second timer is started to establish how long one will wait for a response to a page request which will be transmitted to the specified paging area. At 234, the system sends a page request to each of the location areas within the defined paging area. The system asks at 240 whether a page response has been received from the desired mobile station. If so, at 266 the second timer is stopped; thereafter, the system at 268 connects the calling party to the desired mobile station. At 270 the system records the location area from which a page response was received and where the mobile station last registered for statistical purposes. The paging process ends at 272.

If at 240, a page response is not received by the system from the desired mobile station the second timer will expire at 236. The system then asks at 238 whether service area paging has been enabled for the system. If service area paging has not been enabled the system proceeds to 242 where the calling party is informed that the mobile station cannot be reached. The paging process then ends at 244.

If at 238 service area paging has been enabled for the system, then, at 246, a third timer is started. Thereafter, at 248 the system sends page requests to all location areas within the system area. The system then asks at 250 whether a page response has been received from the desired mobile station. If yes, at 252, the third timer is stopped. Next, at 254 the calling party is connected to the desired mobile station; and, at 256 the system records the location area from which the response was received and where the mobile station last registered for statistical purposes. The paging process then ends at 258.

If, at 250 a page response is not received from the desired mobile station, at 260 the third timer will expire. Next, at 262 the system will inform the calling party that the mobile station cannot be reached. The paging process then end at 264.

In summary, the paging process optimizes the use of the control channel capacity by first sending a page request to the last known location of the desired mobile station. If no response is received within a specified time period, page requests are sent to a group of predetermined location areas, i.e. a paging area, which includes the location area where the desired mobile station last registered and a plurality of location areas wherein the mobile station would be statistically likely to be found if it had last registered within the previously paged location area. This paging area includes more than one location area and less than the total of all location areas within the system area. A paging area may also extend into and include location areas within a contiguous neighboring cellular system. If a response is still not received from the mobile station after the paging area page, then a service area page will be transmitted.

It should be noted that the statistical information gathered by the system relating the location area in which a mobile was actually located (based upon a response to either a paging area page or a service area page) to the location in which it last registered forms a basis for the grouping of location areas into paging areas. That is, the idiosyncratics of the geographic terrain and obstructions of a system will affect the reception of radio signals in different cells and location areas thereof and these statistical data enable an operator to configure both contiguous and overlapping paging areas to optimize the likelihood of locating the mobile while minimizing the load on the control channel capacity of the system.

As can be seen from the above description, the present invention allows a cellular communication system operator to create a paging area, associated with each location area and comprising a plurality of additional location areas in the region thereof, where a mobile subscriber is most likely to be found if it must be paged outside the location area of its last registration. Since each paging area is composed of a plurality of location areas their use helps overcome uncertainties in pinpointing the exact location of a mobile station while using the available paging capacity more efficiently by reducing the requirement for service area paging.

It is believed that the operation and construction of the present invention will be apparent from the foregoing description and, while the method and apparatus shown and described has been characterized as being preferred, obvious changes and modifications may be made therein without departing from the spirit and scope of the invention as defined in the following claims.

What is claimed is:

1. A method of paging mobile stations within a cellular telecommunication system in which groups of cells are arranged in location areas and groups of location areas are arranged in paging areas, said method comprising the steps of:

receiving from a calling party a call request for a desired mobile station;

determining within which location area said desired mobile station last registered;

sending a first paging message to said location area within which said desired mobile station last registered;

connecting said calling party to said desired mobile station if a page response is received from said desired mobile station in response to said first paging message;

determining if paging area paging is enabled for said telecommunication system if a page response is not received from said desired mobile station in response to said first paging message;

informing said calling party that said desired mobile station is not available if paging area paging is not enabled for said telecommunication system;

determining which paging area is associated with the location area in which said mobile station last registered if paging area paging is enabled for said telecommunication system;

accessing a list including a plurality of location areas defined by said paging area;

sending a second paging message to said plurality of location areas within said paging area;

connecting said calling party to said desired mobile station if a page response is received from said desired mobile station in response to said second paging message;

determining if service area paging is enabled for said telecommunication system if a page response is not received from said desired mobile station as a result of said second paging message;

informing said calling party that said desired mobile station is not available if service area paging is not enabled for said telecommunication system;

sending a third paging message to all location areas within said service area if service area paging is enabled for said telecommunication system; and informing said calling party that said desired mobile station is not available if a page response is not received from said desired mobile station in response to said third paging message.

2. A method of paging within a cellular telecommunication system as set forth in claim 1 wherein said step of sending a second paging message to said plurality of location areas within said paging area includes sending said second paging message to more than one location area and fewer location areas than are contained within said service area.

3. A method of optimizing the utilization of forward control channel resources within a cellular telecommunication system in which groups of cells are arranged in location areas and groups of location areas are arranged in paging areas making up the service area, said method comprising the steps of:

receiving from a calling party a call request for a desired mobile station;

determining within which location area said desired mobile station last registered;

sending a first paging message to said location area;

connecting said calling party to said mobile station if a page response is received from said mobile station in response to said first paging message;

determining if paging area paging is enabled for said system if a page response is not received from said mobile station in response to said first paging message;

informing said calling party that said mobile station is not available if paging area paging is not enabled for said system;

determining which paging area is associated with the location area in which said mobile station last registered if paging area paging is enabled for said system;

accessing a list including a plurality of location areas defined by said paging area;

sending a second paging message to said plurality of location areas within said paging area;

connecting said calling party to said mobile station if a page response is received from said mobile station in response to said second paging message;

determining if service area paging is enabled for said system if a page response is not received from said mobile station as a result of said second paging message;

informing said calling party that said mobile station is not available if service area paging is not enabled for said system;

sending a third page attempt to all location areas within said service area if service area paging is enabled for said system; and informing said calling party that said mobile station is not available if a page response is not received from said mobile station in response to said third paging message.

4. A method of optimizing utilization of forward control channel resources within a cellular telecommunication system as set forth in claim 3 wherein said step of sending a second paging message to said plurality of location areas within said paging area includes sending said second paging message to more than one location area and fewer location areas than are contained within said service area.

* * * * *

UNITED STATES PATENT AND TRADEMARK OFFICE
CERTIFICATE OF CORRECTION

PATENT NO. : 5,369,681
DATED : November 29, 1994
INVENTOR(S) : Alain Boudreau et al.

It is certified that error appears in the above-indentified patent and that said Letters Patent is hereby corrected as shown below:

Column 1, line 8         Delete "07,88,598"
                             Insert --07/881,598--.

Column 1, line 9         After "May"
                             Delete ",".

Column 1, line 16        Delete "FIELD OF THE INVENTION"
                             Insert --Field of the Invention--.

Column 5, line 17        Delete "i f"
                             Insert --if--.

Column 6, line 15        Delete "I f"
                             Insert --If--.

Signed and Sealed this

Twenty-seventh Day of February, 1996

Attest:

BRUCE LEHMAN

*Attesting Officer*  *Commissioner of Patents and Trademarks*